(12) United States Patent
Lee et al.

(10) Patent No.: US 9,140,838 B2
(45) Date of Patent: Sep. 22, 2015

(54) POLARIZING PLATE FOR OLED AND OLED DISPLAY INCLUDING THE SAME

(71) Applicants: Moon Yeon Lee, Uiwang-si (KR); Kyoung Ah Oh, Uiwang-si (KR); Kyu Yeol In, Uiwang-si (KR)

(72) Inventors: Moon Yeon Lee, Uiwang-si (KR); Kyoung Ah Oh, Uiwang-si (KR); Kyu Yeol In, Uiwang-si (KR)

(73) Assignee: CHEIL INDUSTRIES, INC., Gumi-si, Gyeongsangbuk-do (KR)

( * ) Notice: Subject to any disclaimer, the term of this patent is extended or adjusted under 35 U.S.C. 154(b) by 0 days.

(21) Appl. No.: 14/310,094

(22) Filed: Jun. 21, 2014

(65) Prior Publication Data
US 2015/0002010 A1  Jan. 1, 2015

(30) Foreign Application Priority Data
Jun. 28, 2013 (KR) .................. 10-2013-0076077

(51) Int. Cl.
*H01J 31/14* (2006.01)
*G02B 5/30* (2006.01)

(52) U.S. Cl.
CPC ............ *G02B 5/3083* (2013.01); *G02B 5/3025* (2013.01)

(58) Field of Classification Search
CPC .............. G01B 6/0056; G02F 6/00012; G02F 1/133536
USPC ........................................ 313/112; 359/489.07
See application file for complete search history.

(56) References Cited

U.S. PATENT DOCUMENTS 7,528,915 B2 *  5/2009  Choi et al. .................... 349/122

FOREIGN PATENT DOCUMENTS

KR    10-2012-0081362 A     7/2012

* cited by examiner

*Primary Examiner* — Vip Patel
(74) *Attorney, Agent, or Firm* — Lee & Morse, P.C.

(57) ABSTRACT

A polarizing plate for an OLED and an OLED display, the polarizing plate including a polarizer; a first retardation layer on a lower side of the polarizer; a second retardation layer on a lower side of the first retardation layer; and a pattern layer on a lower side of the second retardation layer, the pattern layer including a plurality of engraved patterns on a lower side thereof.

22 Claims, 7 Drawing Sheets

POLARIZING PLATE FOR OLED AND OLED DISPLAY INCLUDING THE SAME

CROSS-REFERENCE TO RELATED APPLICATION

Korean Patent Application No. 10-2013-0076077, filed on Jun. 28, 2013, in the Korean Intellectual Property Office, and entitled: "Polarizing Plate For OLED And OLED Display Including The Same," is incorporated by reference herein in its entirety.

BACKGROUND

1. Field

Embodiments relate to a polarizing plate for an organic light emitting diode (OLED) and an OLED display including the same.

2. Description of the Related Art

OLED panels are spotlighted as next generation displays and have very high growth opportunities in the market.

SUMMARY

Embodiments are directed to a polarizing plate for an organic light emitting diode (OLED) and an OLED display including the same.

The embodiments may be realized by providing a polarizing plate for an OLED, the polarizing plate including a polarizer; a first retardation layer on a lower side of the polarizer; a second retardation layer on a lower side of the first retardation layer; and a pattern layer on a lower side of the second retardation layer, the pattern layer including a plurality of engraved patterns on a lower side thereof.

The pattern layer may have an index of refraction of about 1.46 to about 1.80.

An aspect ratio (H/A) of a height (H) of each engraved pattern to a width (A) of each engraved pattern may be about 1 to about 3.

The engraved patterns may be separated from each other, and a ratio (S/A) of a separation (S) between the engraved patterns to a width (A) of each of the engraved patterns may be about 3.0 or less.

The pattern layer may include at least one of a (meth)acrylic resin, a polycarbonate resin, a polyester resin, a cycloolefin polymer resin, a cellulose resin, or a polyvinyl chloride resin.

Each of the engraved patterns may include a filling section that is filled with a filler, the filler having a lower index of refraction than that of the pattern layer.

The filler may include air.

The filler may include a filling resin having an index of refraction of about 1.20 to about 1.45.

The filler may include a filling resin layer having an index of refraction of about 1.20 to about 1.45, and an air layer stacked on the filling resin layer in a thickness direction of the filling section.

The filler may include a filling resin layer having an index of refraction from about 1.20 to about 1.45, and an adhesive layer stacked on the filling resin layer in a thickness direction of the filling section.

The filler may include a filling resin having an index of refraction of about 1.20 to about 1.45, and a light spreading agent.

The polarizing plate may further include at least one of an adhesive layer, a first optical layer, a second optical layer, and a light spreading layer on a lower side of the pattern layer, wherein when the first optical layer is included, the first optical layer has a lower index of refraction than the pattern layer, when the first optical layer and the second optical layer are included, the second optical layer has a lower index of refraction than the first optical layer.

The polarizing plate may further include a base layer between the second retardation layer and the pattern layer.

The polarizing plate may further include a light spreading layer between the base layer and the pattern layer.

The polarizing plate may further include a protective layer on an upper side of the polarizer.

The filling resin may include at least one of a (meth)acrylic resin, a polycarbonate resin, a polyester resin, a cycloolefin polymer resin, a cellulose resin, or a polyvinyl chloride resin.

The polarizing plate may include the first optical layer, and the first optical layer may include at least one of a (meth)acrylic resin, a polycarbonate resin, a polyester resin, a cycloolefin polymer resin, a cellulose resin, or a polyvinyl chloride resin.

The first retardation layer may have an in-plane retardation (Re) at a wavelength of 550 nm of about 250 nm to about 300 nm, and the second retardation layer may have an in-plane retardation (Re) at a wavelength of 550 nm of about 110 nm to about 160 nm.

The first retardation layer may have an out-of-plane retardation (Rth) at a wavelength of 550 nm of about 0 nm to about 300 nm, and the second retardation layer may have an out-of-plane retardation (Rth) at a wavelength of 550 nm of about −160 nm to about 0 nm.

The first retardation layer may have a short wavelength dispersibility of about 1.00 to about 1.05 and a long wavelength dispersibility of about 0.95 to about 1.00, and the second retardation layer may have a short wavelength dispersibility of about 1.00 to about 1.20 and a long wavelength dispersibility of about 0.85 to about 1.00.

An angle defined between a slow axis of the first retardation layer and an absorption axis of the polarizer may be about 63° to about 73° or about −73° to about −63°, and an angle defined between a slow axis of the second retardation layer and the absorption axis of the polarizer may be about −5° to about 5°.

The embodiments may be realized by providing an OLED display including the polarizing plate for an OLED according to an embodiment.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
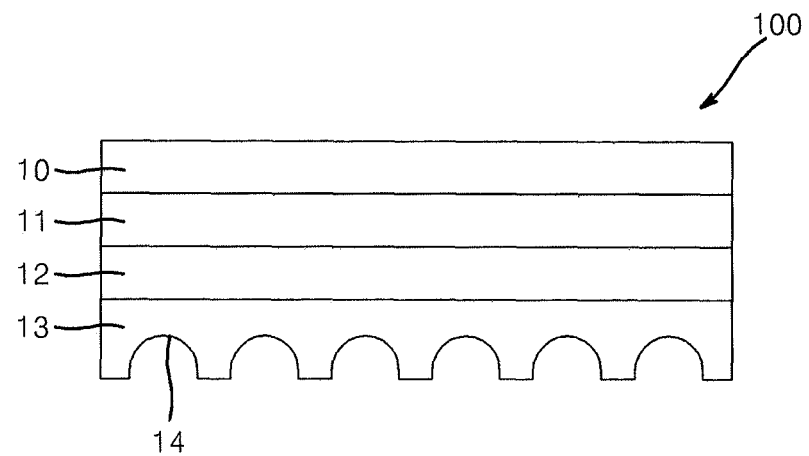
FIG. 1 illustrates a sectional view of a polarizing plate for OLEDs according to one embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

As used herein, directional terms such as "upper" and "lower" are defined with reference to the accompanying drawings. Thus, it will be understood that the term "upper" can be used interchangeably with the term "lower".

FIG. 1 illustrates a sectional view of a polarizing plate for OLEDs according to one embodiment.

Referring to FIG. 1, a polarizing plate 100 may include a polarizer 10, a first retardation layer 11 on a lower side of the polarizer 10, a second retardation layer 12 on a lower side of the first retardation layer 11, and a pattern layer 13 on a lower side of the second retardation layer 12 (the pattern layer 13 including a plurality of engraved patterns 14). For example, the first retardation layer 11 may be between the polarizer 10 and the second retardation layer 12 and/or the second retardation layer 12 may be between the first retardation layer 11 and the pattern layer 13. For example, the polarizer 10 may be on one outer side of the polarizing plate 100 and the pattern layer 13 may be on another, opposite outer side of the polarizing plate 100.

The pattern layer 13 may be on the lower surface of the second retardation layer and on or facing an outer side, e.g., an upper side, of a display panel (not shown in FIG. 1) such that light emitted from a light emitting section of the display panel may enter the pattern layer 13 and may pass through a predetermined pattern, which may help minimize lateral color shift while suppressing an undesirable WAD phenomenon. The pattern layer 13 may have an index of refraction (n1) of, e.g., about 1.46 to about 1.80. Within this range of the index of refraction, the pattern layer 13 may permit less variation of color visibility depending upon viewing angle, while providing excellent properties in terms of light transmittance, light diffusibility, and reliability. The pattern layer 13 may be formed of or may include a transparent polymer resin. The transparent polymer resin may include, e.g., polyesters such as (meth)acrylic resins, polycarbonates, polyethylene terephthalate, polybutylene terephthalate, or the like, cycloolefin polymers, celluloses, polyvinyl chloride, or the like. For example, the pattern layer 13 may include at least one of a (meth)acrylic resin, a polycarbonate resin, a polyester resin, a cycloolefin polymer resin, a cellulose resin, or a polyvinyl chloride resin. In an implementation, the pattern layer 13 may be formed of or may include an acrylic resin.

The engraved patterns 14 may be separated from the lower surface of the second retardation layer 12, and may have a predetermined cross-section. For example, the engraved patterns 14 may extend inwardly from the surface of the pattern layer 13 that is opposite to the surface that faces the second retardation layer 12. The engraved pattern 14 may include one of, e.g., a prism pattern of a polygonal cross-section, a wave pattern of a polygonal cross-section, a dot pattern of a polygonal cross-section, a prism pattern of a semi-circular cross-section, a wave pattern of a semi-circular cross-section, a dot pattern of a semi-circular cross-section, a lenticular lens pattern of a semi-circular cross-section, a prism pattern of a semi-elliptical cross-section, a wave pattern of a semi-elliptical cross-section, a dot pattern of a semi-elliptical cross-section, a lenticular lens pattern of a semi-elliptical cross-section, a prism pattern of a semi-oval cross-section, a wave pattern of a semi-oval cross-section, a dot pattern of a semi-oval cross-section, a lenticular lens pattern of a semi-oval cross-section, or a micro-concave lens pattern. For example, the engraved pattern 14 may include one of a prism pattern of a semi-circular cross-section, a prism pattern of a semi-elliptical cross-section, a prism pattern of a semi-oval cross-section, a lenticular lens pattern of a semi-circular cross-section, or a micro-concave lens pattern, which have a concave lens-shaped surface. In an implementation, the engraved pattern may 14 include a micro concave-lens pattern. Light having high color purity (of incident light from a display panel) may be output in a perpendicular direction with respect to a light exit plane, and a micro-concave lens pattern may be advantageously used to achieve broader spreading of the light having high color purity. Here, the term "polygonal" shape means a polygon, the number (n) of sides of which is at least three (for example: 3 to 10), and the term "prism" pattern means a pattern, a width of which is symmetrical with respect to a center line thereof.

Figure 4A:
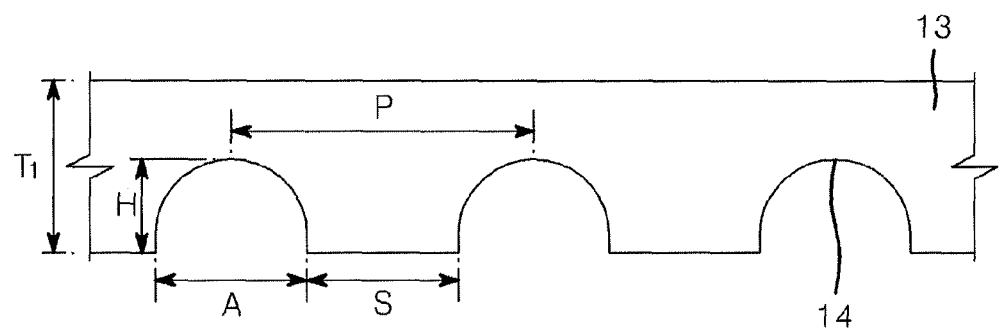
FIG. 4a illustrates an enlarged sectional view of a pattern layer according to one embodiment.
Figure 4B:
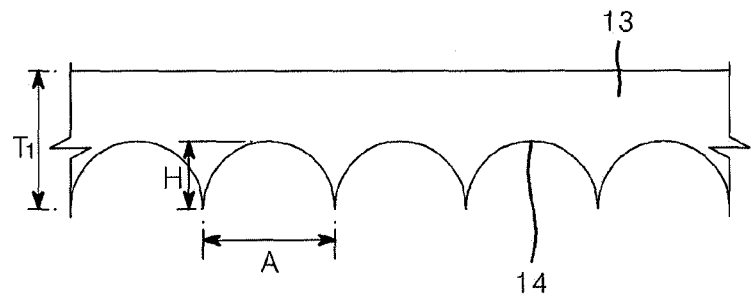
FIG. 4b illustrates an enlarged sectional view of a pattern layer according to another embodiment.

FIGS. 4a and 4b illustrate partial sectional views of a pattern layer 13 that includes a plurality of lenticular lens-shaped engraved patterns 14 formed thereon. For example, FIG. 4a illustrates a pattern layer that has a separation or space between the engraved patterns 14, and FIG. 4b illustrates a pattern layer that has no separation or space between the engraved patterns 14. Referring to FIG. 4a and FIG. 4b, a ratio ($T_1$/H) of a thickness ($T_1$) of the pattern layer 13 to a height (H) of the patterns 14 may be, e.g., about 1.2 to about 50, and an aspect ratio of the patterns (H/A), e.g., of the height (H) of the patterns 14 to a width (A) thereof may be, e.g., about 1 to about 3 or about 1.5 to about 2.5. The patterns 14 may have a width (A) of about 1 μm to about 1,000 μm, a height (H) of about 1 μm to about 2,000 μm, and/or a pitch (P) of about 1 μm to about 5,000 μm. Here, the pitch refers to a distance from a highest peak of one pattern 14 to a highest peak of another pattern 14 adjacent thereto. Within these ranges, the polarizing plate may most efficiently prevent of color change depending upon viewing angle.

In an implementation, when the plural engraved patterns 14 are separated a predetermined distance from each other, the separation between the patterns 14 may be greater than the width of the patterns 14, and the pattern layer may allow large amounts of light emitted from the display panel to be transmitted therethrough. Referring to FIG. 4a, a ratio (S/A) of separation (S) between the patterns to the width (A) of the patterns may be about 3.0 or less, e.g., about 1.0 to about 2.0. The separation (S) between the patterns may be greater than 0 to about 4,000 μm or less, e.g., from about 0.1 μm to about 4,000 μm. Within these ranges, the polarizing plate may most efficiently minimize of color change depending upon viewing angle. Herein, the term "separation" between the patterns refers to a distance between adjacent patterns on the lower surface of the pattern layer 13.

The thickness ($T_1$) of the pattern layer 13 may be greater than the height (H) of the patterns 14, and may be, e.g., about 5 μm to about 5,000 μm or about 5 μm to about 80 μm. Within this range, the polarizing plate may help suppress WAD and may be used in a display.

It may be advantageous that the patterns have a high aspect ratio in order to achieve color improvement. In this case, however, there may be difficulty of bite processing for pattern formation and roll processing for such bite processing, and it may be difficult to achieve mass production due to significantly low yield. However, the polarizing plate 100 according to an embodiment may achieve excellent color improvement even at low aspect ratio of the patterns 14 by filling a space in the engraved pattern 14 of the pattern layer 13, e.g., a filling section 15 of the pattern layer 13, with a filler that has a lower index of refraction than the pattern layer 13.

Figure 2:
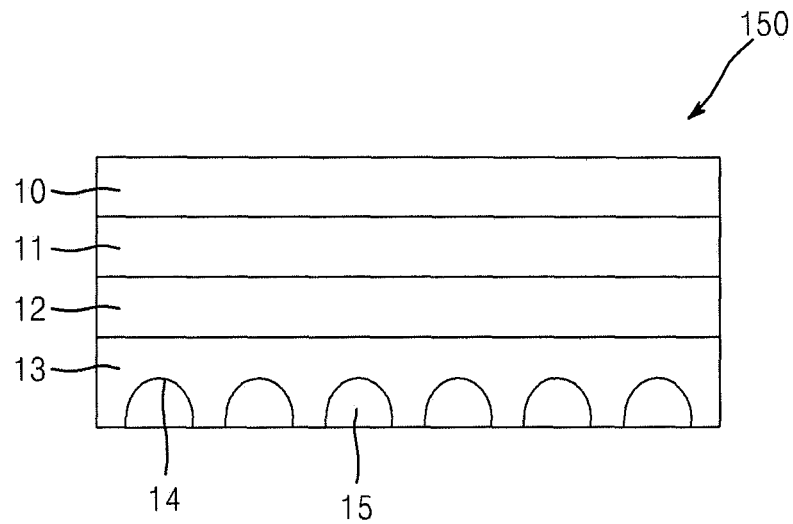
FIG. 2 illustrates a sectional view of a polarizing plate for OLEDs according to another embodiment.

FIG. 2 illustrates a sectional view of a polarizing plate for OLEDs according to another embodiment.

Referring to FIG. 2, a polarizing plate 150 may include a polarizer 10, a first retardation layer 11 on a lower side of the polarizer 10, a second retardation layer 12 on a lower side of the first retardation layer 11, a pattern layer 13 on a lower side of the second retardation layer 12 (and including a plurality of engraved patterns 14 on a lower side thereof), and a filling section 15 that is formed by filling spaces in the engraved patterns 14 with a filler.

The filler (that fills the filling section 15) may have a lower index of refraction than the pattern layer 13. For example, the filler may have an index of refraction of about 1 to about 1.45. Within this range, the polarizing plate may undergo less color change depending upon viewing angle, and may exhibit excellent properties in terms of light transmittance, light diffusibility, and reliability. For example, the filling section may be filled with a filler including at least one of air (index of refraction: 1), filling resins having a lower index of refraction (n2) than the pattern layer 13 (for example, from about 1.20 to about 1.45 or about 1.35 to about 1.45), or adhesives having a lower index of refraction than the pattern layer 13 (e.g., index of refraction: about 1.35 to about 1.45).

The filling resin may include a non-adhesive transparent resin having a lower index of refraction (n2) than the pattern layer 13. In an implementation, the filling resin may include a polyester resin, a (meth)acrylic resin, a polycarbonate resin, a polyethylene terephthalate resin, a cycloolefin polymer resin, a cellulose resin, a polyvinyl chloride resin, or the like. For example, the filling resin may include at least one of a (meth)acrylic resin, a polycarbonate resin, a polyester resin, a cycloolefin polymer resin, a cellulose resin, or a polyvinyl chloride resin.

The adhesive may include a transparent adhesive resin having an index of refraction of about 1.35 to about 1.45. The adhesive may include, e.g., a (meth)acrylic adhesive resin.

In an implementation, the filling section 15 may be filled with air (index of refraction=1), e.g., the filler may include air. Accordingly, a difference in index of refraction between the filling section 15 and the pattern layer 13 may be increased without using a transparent adhesive resin having a low index of refraction and a separate filling process, thereby providing color improvement while enhancing process efficiency.

In an implementation, the filling section 15 may be filled with a filling resin having an index of refraction (n2). For example, a light spreading agent may be used irrespective of the shape of the pattern layer, thereby providing color improvement not only in a horizontal direction but also in a vertical direction. In an implementation, the filling section may be filled with multiple layers (e.g., the filler may include an air layer and a filling resin layer), having an index of refraction (n2), in a thickness direction thereof, and an adhesive layer may be formed on the lower side of the pattern layer to attach the polarizing plate to a display panel. For example, the filling section may include a filling resin layer in an innermost area thereof and may include an air layer on the filling resin layer and adjacent to an opening of the filling section.

In an implementation, the filling section may be filled with multiple layers (e.g., the filler may include an adhesive layer and a filling resin layer), having an index of refraction (n2), in the thickness direction thereof, and an adhesive layer may be formed on the lower side of the pattern layer to attach the polarizing plate to the display panel. For example, the filling section may include a filling resin layer in an innermost area thereof and may include an adhesive layer on the filling resin layer and adjacent to an opening of the filling section.

FIG. 5 to FIG. 8 illustrate sectional views of a pattern layer and a filling section according to embodiments.

Figure 5:
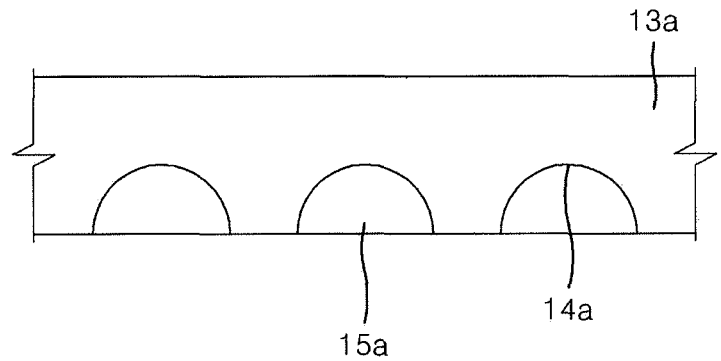
FIG. 5 illustrates a sectional view of a pattern layer according to one embodiment.
Figure 6:
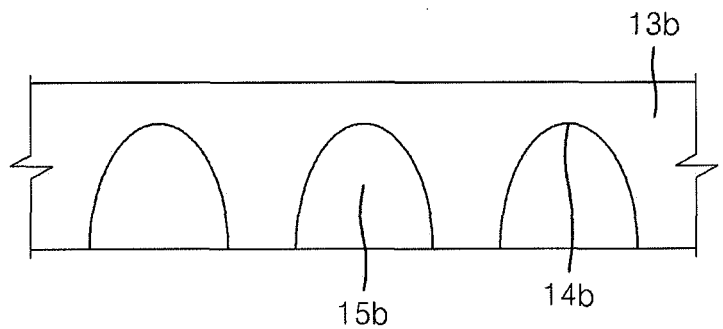
FIG. 6 illustrates a sectional view of a pattern layer according to another embodiment.
Figure 7:
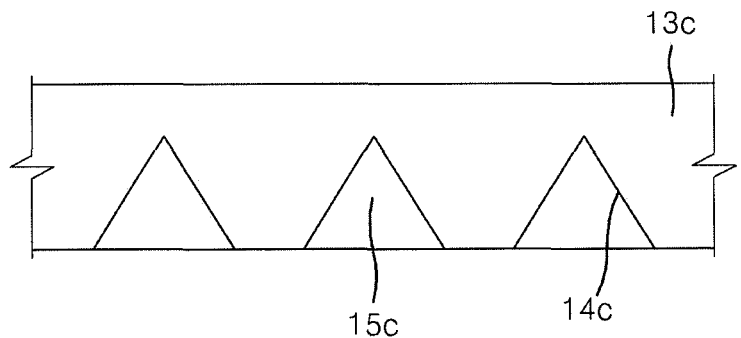
FIG. 7 illustrates a sectional view of a pattern layer according to a further embodiment.
Figure 8:
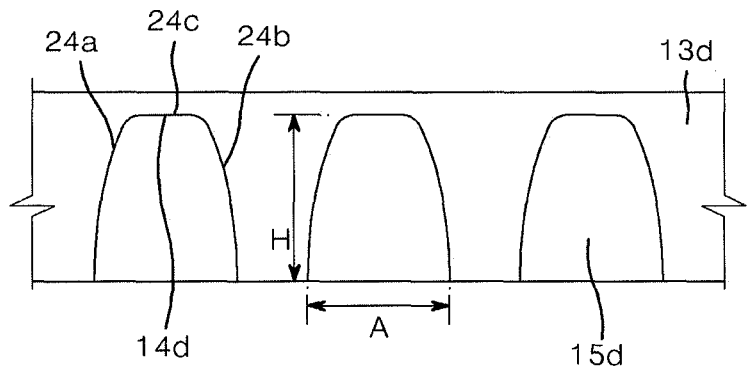
FIG. 8 illustrates a sectional view of a pattern layer according to yet another embodiment.

Referring to FIG. 5, a pattern layer 13a may include prism patterns 14a (having a semi-circular cross-section) on a lower side thereof, and each of the patterns 14a may include a filling section 15a therein. Referring to FIG. 6, a pattern layer 13b may include prism patterns 14b (having a semi-oval cross-section) on a lower side thereof, and each of the patterns 14b may include a filling section 15b therein. Referring to FIG. 7, the pattern layer 13c may include prism patterns 14c (having a triangular cross-section) on a lower surface thereof, and each of the patterns 14c may include a filling section 15c therein. Referring to FIG. 8, a pattern layer 13d may include prism patterns 14d on a lower side thereof, and each prism pattern 14d may include a first side 24a, a second side 24b (facing the first side 24a), and a third side 24c (connecting the first side 24a to the second side 24b and having a different, e.g., smaller or larger, average radius of curvature than the first and second sides 24a, 24b). Each of the prism patterns may include a filling section 15d having a ratio (H/A) of height (H) to width (A) of about 2 or less therein. In an implementation, the patterns may have a curved surface, thereby more efficiently preventing color change depending upon viewing angle.

The filling section 15 may be further filled with a light spreading agent. For example, the filler may further include the light spreading agent. When the engraved patterns are concave lens patterns, it is possible to achieve color improvement in the horizontal direction of the panel through such a structure. However, it may be difficult to achieve sufficient color improvement in a vertical direction due to vertical arrangement of lenticular lens shapes. Thus, the filling section may be filled with the light spreading agent to achieve color improvement not only in the horizontal direction but also in the vertical direction.

The light spreading agent may include, e.g., an organic light spreading agent and/or an inorganic light spreading agent. In an implementation, the light spreading agent may include a mixture of the organic and inorganic light spreading agents to provide diffusibility and permeability of light. The organic light spreading agent may include at least one of (meth)acrylic particles, siloxane particles, melamine particles, polycarbonate particles, styrene particles, or mixtures thereof. In an implementation, the organic light spreading agent may include fine cross-linked spherical particles having an average particle diameter (D50) of about 2 μm to about 20 μm.

The inorganic light spreading agent may be added to help improve light diffusibility while preventing deterioration in whiteness, which may otherwise occur upon addition of the spherical organic light spreading agent. Processability may be deteriorated with increasing amount of the inorganic light spreading agent, and it may be desirable to add a suitable amount of the inorganic light spreading agent. Examples of the inorganic light spreading agent may include calcium carbonate, barium sulfate, titanium dioxide, aluminum hydroxide, silica, glass, talc, mica, white carbon, magnesium oxide, and zinc oxide. In an implementation, the inorganic light spreading agent may include fine spherical particles having an average particle diameter (D50) of about 2 μm to about 20 μm.

In an implementation, the organic light spreading agent may include polymer particles coated with black dyes. If the polymer particles coated with black dyes were to be used alone as the organic light spreading agent, deterioration in light transmittance causing brightness deterioration might occur. The organic light spreading agent may further include, e.g., non-coated silicone particles, acrylic particles, or mixtures thereof. In an implementation, the organic light spreading agent may be prepared by mixing suitable amounts of the black dye-coated polymer particles and the non-coated polymer particles to adjust brightness, color change depending upon viewing angle, contrast, reflected colors, and the like. For example, polymethyl methacrylate particles coated with black dyes, and non-coated silicon particles, acrylic particles or mixtures thereof as the non-coated polymer particles may be mixed in a weight ratio of about 1:0.25 to about 1:4. In an implementation, the filling section may be filled with about 0.1 wt % to about 10 wt % of the light spreading agent. Within this content range of the light spreading agent, the polarizing plate may achieve color improvement in the horizontal and vertical directions, lateral visibility improvement, and less WAD.

The pattern layer 13 and the filling section may be stacked on one surface of an OLED display panel. In an implementation, the pattern layer and the filling section may be stacked on the OLED display panel with an adhesive, e.g., pressure sensitive adhesives (PSA).

The pattern layer 13 (e.g., including the filling section 15 filled with the filler) may be formed by a suitable method. For example, a resin for forming the pattern layer 13 may be coated onto a base layer and subjected to patterning by engraving to form engraved patterns. Then, the engraved patterns may be filled with the filling resin or the adhesive, followed by drying or curing, thereby forming the pattern layer 13.

The polarizer 10 may be a linear polarizer that converts the polarization of incident light into linear polarization, and may be, e.g., an iodine-doped polyvinyl alcohol film. The polarizer may have a thickness of about 5 μm to about 60 μm. Within this thickness range, the polarizer can be applied to displays.

The first retardation layer 11 may have an in-plane retardation (Re) at a wavelength of 550 nm of about 240 nm to about 300 nm, e.g., about 250 nm to about 300 nm or about 260 nm to about 280 nm. For example, the first retardation layer 11 may be a half-wave plate λ/2 layer. The second retardation layer 12 may have an in-plane retardation (Re) at a wavelength of 550 nm of about 110 nm to about 160 nm, e.g., about 130 nm to about 140 nm. For example, the second retardation layer may be a quarter-wave plate λ/4 layer.

Herein, the in-plane retardation (Re) may be represented by the following Equation 1.

$$Re = (nx - ny) \times d$$

In Equation 1, nx and ny are indexes of refraction in x- and y-axis directions of the retardation layer, respectively, and d is a thickness of the retardation layer (unit: nm).

With respect to incident light at a reference wavelength, an out-of-plane retardation of the first retardation layer and an out-of-plane retardation of the second retardation layer may have opposite signs. For example, with respect to incident light at a reference wavelength, the first retardation layer may have a positive out-of-plane retardation and the second retardation layer may have a negative out-of-plane retardation.

In an implementation first retardation layer may have an absolute out-of-plane retardation (Rth) at a wavelength of 550 nm of about 300 nm or less, and the second retardation layer may have an absolute out-of-plane retardation (Rth) at a wavelength of 550 nm of about 160 nm or less. In an implementation, the first retardation layer may have Rth of about 0 to about 300 nm, e.g., about 130 to about 250 nm or about 200 to about 230 nm, and the second retardation layer may have Rth of about −160 to about 0 nm, e.g., about −130 nm to about −50 nm or about −120 nm to about −90 nm. Within the range, the polarizing plate may have an improved degree of polarization.

Herein, the out-of-plane retardation (Rth) can be represented by the following Equation 2.

$$Rth = ((nx + ny)/2 - nz) \times d,$$

In Equation 2, nx, ny and nz are indexes of refraction in x-, y- and z-axis directions of the retardation layer, respectively, and d is a thickness of the retardation layer (unit: nm).

In the retardation layer, the x-, y- and z-axis directions refer to a longitudinal direction, a widthwise direction, and a thickness direction, respectively.

In an implementation, the first retardation layer 11 may have a short-wavelength dispersibility of about 1.00 to about 1.05, and the second retardation layer 12 may have a short-wavelength dispersibility of about 1.00 to about 1.20. Here, the term "short wavelength dispersibility" refers to a value obtained by dividing a retardation value with respect to incident light at 450 nm by a retardation value with respect to incident light at 550 nm.

In an implementation, the first retardation layer 11 may have a long-wavelength dispersibility of about 0.95 to about 1.00, and the second retardation layer 12 may have a long wavelength dispersibility of about 0.85 to about 1.00. The term "long wavelength dispersibility" refers to a value obtained by dividing a retardation value with respect to incident light at 650 nm by a retardation value with respect to incident light at 550 nm.

Each of the first and second retardation layers 11, 12 may be formed of or may include a transparent polymer resin. In an implementation, the transparent polymer resin may include at least one of cycloolefin polymer, polycarbonate, polystyrene, poly(meth)acrylates including polymethyl methacrylate, or the like, polyesters including polyethylene terephthalate, cellulose polymers, and acrylic polymers. In an implementation, the first retardation layer 11 may include cycloolefin polymer (COP), and the second retardation layer 12 may include a poly(meth)acrylates including polymethyl methacrylate, or an acrylic polymer. Retardation layers including polystyrene, polyacrylate or cellulose polymers may have a negative out-of-plane retardation with respect to incident light at a reference wavelength.

In an implementation, the first retardation layer 11 may be formed using a non-stretched film, which may be formed of or may include a material having positive birefringence. For example, the non-stretched film may be wound around a roll and may be subjected to oblique stretching at a certain angle with respect to a perpendicular direction to an advancing direction of the non-stretched film while unwinding the non-stretched film from the roll, followed by winding the film around the roll, thereby providing a film having an oblique optical axis. Upon oblique stretching, the stretching angle may be adjusted such that an optical axis of the first retardation layer may be slanted at an angle of about 17° to about 27° or about −27° to about −17° with respect to the perpendicular direction to the progressing direction of the film, and a stretching ratio may be adjusted so as to obtain a desired retardation value.

In an implementation, the second retardation layer 12 may be formed using a non-stretched film, which may be formed of or may include a material having negative birefringence and providing an optical axis to have a maximum index of refraction in a perpendicular direction with respect to a stretching direction. For example, the non-stretched film may be wound around a roll and may be subjected to stretching in a perpendicular direction to an advancing direction of the non-stretched film while unwinding the non-stretched film from the roll, followed by winding the film around the roll, thereby providing the second retardation layer having an optical axis substantially parallel to the advancing direction of the film. Upon stretching, the stretching angle may be adjusted such that the optical axis of the second retardation layer may be slanted at an angle of about 85° to about 95° with respect to the advancing direction of the film, and stretching ratio is adjusted so as to obtain a desired retardation value.

The first retardation layer 11 and the second retardation layer 12 may have the same or different thicknesses. In an implementation, the first retardation layer may have a thickness of about 5 μm to about 100 μm, and the second retardation layer 12 may have a thickness of about 5 μm to about 100 μm. Within these thickness ranges of the first and second retardation layers, the polarizing plate may be applied to displays.

Figure 3:
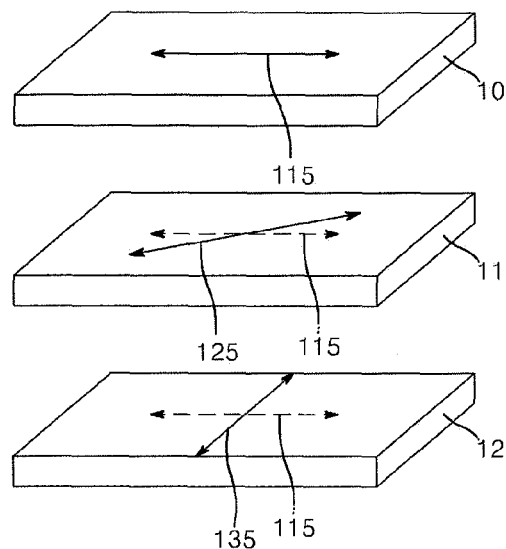
FIG. 3 illustrates a perspective view of a polarizing plate for OLEDs, showing an optical axis relationship between a polarizer, a first retardation layer, and a second retardation layer.

FIG. 3 illustrates a perspective view of a polarizing plate for OLEDs, showing an optical axis relationship between the polarizer, the first retardation layer, and the second retardation layer.

Referring to FIG. 3, an angle defined between a slow axis 125 of the first retardation layer 11 and a transmission axis 115 of the polarizer 10 may be about 17° to about 27° or about −27° to about −17°; and an angle defined between a slow axis 135 of the second retardation layer 12 and a transmission axis 115 of the polarizer 10 may be about 85° to about 95°. An angle defined between the slow axis 125 of the first retardation layer 11 and the slow axis 135 of the second retardation layer 12 may be about 63° to about 73° or about −73° to about −63°. The transmission axis of the polarizer may be substantially perpendicular to an absorption axis thereof (not shown in FIG. 3), and an angle defined between the slow axis 125 of the first retardation layer 11 and the absorption axis of the polarizer 10 may be about 63° to about 73° or about −73° to about −63°; and an angle defined between the slow axis 135 of the second retardation layer 12 and the absorption axis of the polarizer 10 may be about −5° to about 5°.

Assuming that, in a laminate of a half-wave plate and a quarter-wave plate bonded to each other, an angle of a slow axis of the half-wave plate relative to a predetermined reference angle is θo and an angle of a slow axis of the quarter-wave plate relative to the predetermined reference angle is θ1, the laminate of the half-wave plate and the quarter-wave plate may convert linear polarization into circular polarization when satisfying Formula: θ1=2×θo+45°.

Accordingly, when the first retardation layer 11 and the second retardation layer 12 are stacked at a predetermined angle satisfying this formula, the laminate of the first and second lamination layers may provide a function of circular polarization. In an implementation, the laminate of the first and second retardation layers 11, 12 may help realize an effect of preventing lateral color shift.

At least one of the first retardation layer 11 and the second retardation layer 12 may be formed by stretching, and a laminate of the polarizer 10, the first retardation layer 11, and the second retardation layer 12 may be formed in a roll-to-roll manner.

Adhesive layers may be formed between the polarizer 10 and the first retardation layer 11 and/or between the first retardation layer 11 and the second retardation layer 12 to bond the corresponding layers to each other. The adhesive layers may be formed of or may include, e.g., pressure sensitive adhesives (PSA) or the like.

The polarizing plate according to an embodiment may be formed by a suitable method. For example, the polarizing plate may be prepared by sequentially stacking the polarizer 10, the first retardation layer 11, and the second retardation layer 12 via the adhesive layers, followed by stacking the pattern layer 13 on the lower side of the second retardation layer 12 via the adhesive layer.

The polarizing plate may further include at least one of an adhesive layer, a first optical layer having a lower index of refraction than the pattern layer, a second optical layer having a lower index of refraction than the first optical layer, and/or a light spreading layer on the lower side of the pattern layer.

The adhesive layer may include an adhesive resin, e.g., a (meth)acrylic adhesive resin, which may have an index of refraction index of about 1.30 to about 1.50, e.g., about 1.35 to about 1.45.

When the index of refraction of the first optical layer is n3, and the index of refraction of the pattern layer 13 is n1, the indices of refraction may satisfy the following relation: n1>n3>0. As a result, the first optical layer may help provide further improved effects in prevention of WAD, as compared with a structure including only the pattern layer 13 and the filling section 15. When the index of refraction (n3) of the first optical layer is in the range from about 1.20 to about 1.45, the first optical layer may help provide further improved effects in prevention of WAD, as compared with the structure including only the pattern layer 13 and the filling section 15. The first optical layer may be formed of or may include a transparent polymer resin, which may include polyesters, such as (meth)acrylic resins, polycarbonate, polyethylene terephthalate, or the like, cycloolefin polymers, celluloses, polyvinyl chloride, or the like. For example, the first optical layer may include at least one of a (meth)acrylic resin, a polycarbonate resin, a polyester resin, a cycloolefin polymer resin, a cellulose resin, or a polyvinyl chloride resin.

When the index of refraction of the second optical layer is n4, and the index of refraction of the pattern layer 13 is n1, the indices of refraction may satisfy the following relation: n1>n4>0. As a result, the second optical layer may help provide further improved effects in prevention of WAD, as compared with the structure including only the pattern layer 13 and the filling section 15. The index of refraction (n4) of the second optical layer may be, e.g., about 1.1 to about 1.19.

The second optical layer may be formed of or may include a transparent polymer resin, which may include polyesters, such as (meth)acrylic resins, polycarbonate, polyethylene terephthalate, or the like, cycloolefin polymers, celluloses, polyvinyl chloride, or the like. For example, the second optical layer may include at least one of a (meth)acrylic resin, a polycarbonate resin, a polyester resin, a cycloolefin polymer resin, a cellulose resin, or a polyvinyl chloride resin. In an implementation, the filling section 15 and the optical layers may be formed of or may include the same material or resin to facilitate manufacture of the polarizing plate.

The light spreading layer may be formed of or may include a light spreading agent and a UV curable transparent resin having an index of refraction of about 1.35 to about 1.45. The light spreading agent may include at least one of an organic light spreading agent and an inorganic light spreading agent. In an implementation, a mixture of the organic and inorganic light spreading agents may be used to provide diffusibility and transmittance. The organic light spreading agent may include at least one of cross-linked acrylic particles, cross-linked siloxane particles, or cross-linked styrene particles, and/or may be in the form of spherical particles having an average particle diameter (D50) of about 1 μm to about 20 μm. The inorganic light spreading agent may be added to help improve light diffusibility while preventing deterioration in whiteness, which may otherwise occur upon addition of the organic light spreading agent. Examples of the inorganic light spreading agent may include calcium carbonate, barium sulfate, titanium dioxide, aluminum hydroxide, silica, glass, talc, mica, white carbon, magnesium oxide, and zinc oxide. The inorganic light spreading agent may be in the form of spherical particles having an average particle diameter (D50) of about 2 μm to about 20 μm.

Figure 9:
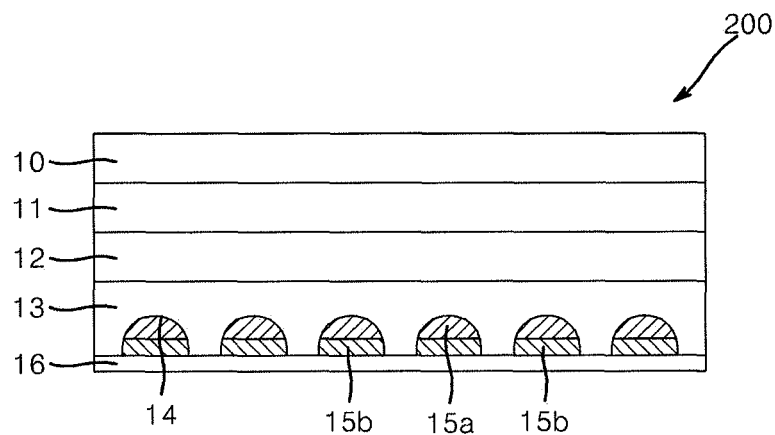
FIG. 9 illustrates a sectional view of a polarizing plate for OLEDs according to a further embodiment.
Figure 10:
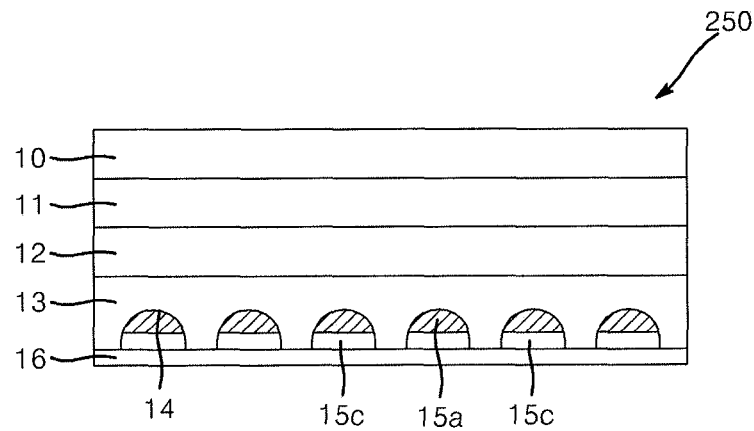
FIG. 10 illustrates a sectional view of a polarizing plate for OLEDs according to yet another embodiment.
Figure 11:
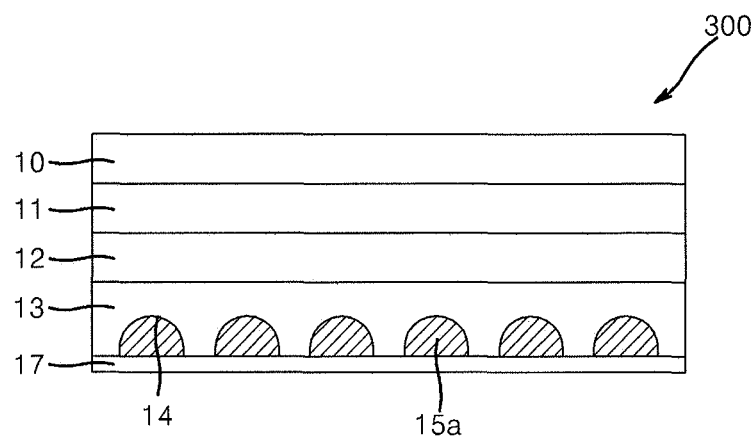
FIG. 11 illustrates a sectional view of a polarizing plate for OLEDs according to yet another embodiment.

FIG. 9 to FIG. 11 illustrate sectional views of polarizing plates according to other embodiments.

Referring to FIG. 9, a polarizing plate 200 may include a polarizer 10; a first retardation layer 11 on a lower side of the polarizer 10; a second retardation layer 12 on a lower side of the first retardation layer 11; a pattern layer 13 on a lower side of the second retardation layer 12 (including a plurality of engraved patterns 14 and a filling section 15 formed on a lower side thereof); and an adhesive layer 16 on a lower side of the pattern layer 13. In an implementation, the filling section 15 may be filled with a filling resin layer 15a (having an index of refraction (n2)) and an adhesive layer 15b.

Referring to FIG. 10, a polarizing plate 250 may include a polarizer 10; a first retardation layer 11 on a lower side of the polarizer 10; a second retardation layer 12 on a lower side of the first retardation layer 11; a pattern layer 13 on a lower side of the second retardation layer 12 (including a plurality of engraved patterns 14 and a filling section 15 on a lower side thereof); and an adhesive layer 16 on a lower side of the pattern layer 13. In an implementation, the filling section 15 may be filled with a filling resin layer 15a (having an index of refraction (n2)) and an air layer 15c.

Referring to FIG. 11, a polarizing plate 300 may include a polarizer 10; a first retardation layer 11 on a lower side of the polarizer 10; a second retardation layer 12 on a lower side of the first retardation layer 11; a pattern layer 13 on a lower side of the second retardation layer 12 (and including a plurality of engraved patterns 14 and a filling section 15 on a lower side thereof); and a first optical layer 17 on a lower side of the pattern layer 13. For example, the pattern layer 13 may be between the second retardation layer 12 and the first optical layer 17. In an implementation, the filling section 15 may be filled with a filling resin layer 15a having an index of refraction (n2).

A laminate of the pattern layer, filling section and optical layers may be prepared by a suitable method. For example, a resin for forming the pattern layer 13 may be coated onto a base layer and subjected to patterning by engraving to form engraved patterns. Then, the filling section in the engraved patterns may be filled with the filling resin, and a resin for forming the optical layer may be coated onto the lower side of the pattern layer 13, followed by drying or curing, thereby providing the laminate of the pattern layer 13, filling section, and optical layers.

In an implementation, the polarizing plate may further include a base layer between the second retardation layer 12 and the pattern layer 13. The base layer may act as a support of the polarizing plate by coupling the second retardation layer 12 to the pattern layer 13. The base layer may include a non-retardation transparent film or glass substrate, and may be formed of, e.g., cellulose such as triacetyl cellulose (ZeroTAC) or the like, acryl, (meth)acrylate, polycarbonate, polyethylene terephthalate, cycloolefin polymer, or polyvinyl chloride. The base layer may have a thickness of about 30 μm to about 100 μm. Within this range, the base layer may be applied to displays.

Figure 12:
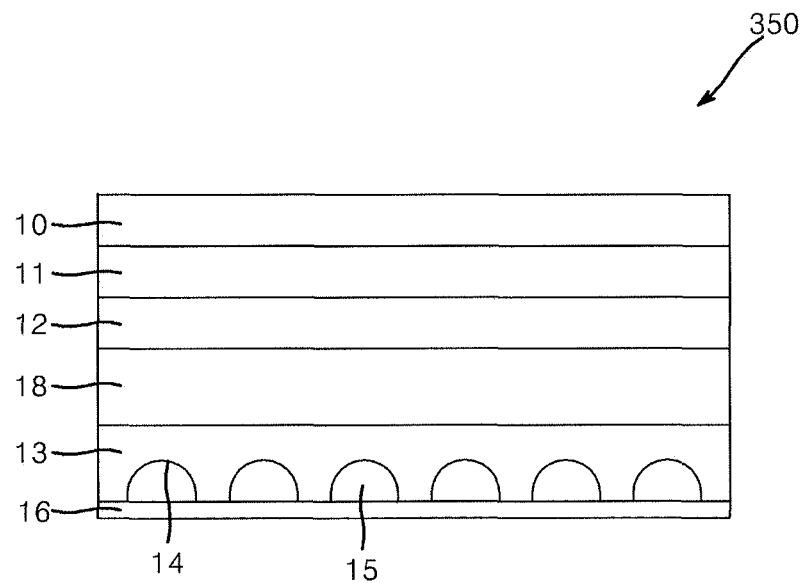
FIG. 12 illustrates a sectional view of a polarizing plate for OLEDs according to yet another embodiment.

FIG. 12 illustrates a sectional view of a polarizing plate according to yet another embodiment.

Referring to FIG. 12, a polarizing plate 350 may include a polarizer 10; a first retardation layer 11 on a lower side of the polarizer 10; a second retardation layer 12 on a lower side of the first retardation layer 11; a pattern layer 13 on a lower side of the second retardation layer 12 (and including a plurality of engraved patterns 14 and a filling section 15 on a lower side thereof); an adhesive layer 16 on a lower side of the pattern layer 13; and a base layer 18 between the second retardation layer 12 and the pattern layer 13. In an implementation, an adhesive layer (e.g., a PSA layer) may be further included between the base layer and the second retardation layer.

Figure 13:
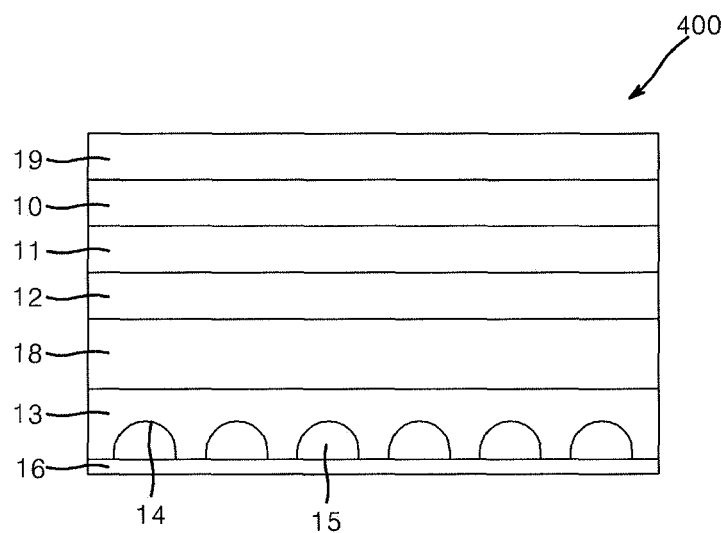
FIG. 13 illustrates a sectional view of a polarizing plate for OLEDs according to yet another embodiment.

FIG. 13 illustrates a sectional view of a polarizing plate according to yet another embodiment.

Referring to FIG. 13, a polarizing plate 400 may include a polarizer 10; a protective layer 19 on an upper side of the polarizer 10; a first retardation layer 11 on a lower side of the polarizer 10; a second retardation layer 12 on a lower side of the first retardation layer 11; a pattern layer 13 on a lower side of the second retardation layer 12 (and including a plurality of engraved patterns 14 and a filling section 15 on a lower side thereof); an adhesive layer 16 on a lower side of the pattern layer 13; and a base layer 18 between the second retardation layer 12 and the pattern layer 13.

For example, the polarizing plate may further include the protective film 19 on an upper side of the polarizer 10 to protect the polarizer 10. For example, the polarizer 10 may be between the protective film 19 and the first retardation film 11. The protective film may help the polarizer 10 while allowing light to pass therethrough. In an implementation, the protective film may 19 be formed of or may include a transparent polymer resin, e.g., cellulose such as triacetyl cellulose (ZeroTAC) or the like, acryl, (meth)acrylate, polycarbonate, polyethylene terephthalate, cycloolefin polymer, or polyvinyl chloride. The protective film 19 may have a thickness of about 10 μm to about 100 μm. Within this range, the protective film 19 may be suitably applied to displays. In an implementation, the polarizing plate 400 may further include a functional coating layer on an upper side of the protective film 19 to provide additional functions to the polarizing plate 400. The functional coating layer may include, e.g., a low reflectance layer, a hard coating layer, an anti-fingerprint layer, or the like.

In an implementation, the polarizing plate 400 may further include a light spreading layer between the base layer 18 and the pattern layer 13 to help improve light transmittance. The light spreading layer may be formed of or may include a light spreading agent and a UV curable transparent resin having an index of refraction of about 1.35 to about 1.45. The light spreading agent may include at least one of an organic light spreading agent or an inorganic light spreading agent. In an implementation, a mixture of the organic and inorganic light spreading agents may provide diffusibility and transmittance. The organic light spreading agent may include at least one of cross-linked acrylic particles, cross-linked siloxane particles, or cross-linked styrene particles, and may be in the form of, e.g., spherical particles having an average particle diameter (D50) of about 1 μm to about 20 μm. The inorganic light spreading agent may be added to help improve light diffusibility while preventing deterioration in whiteness, which might otherwise occur upon addition of the organic light spreading agent. Examples of the inorganic light spreading agent may include calcium carbonate, barium sulfate, titanium dioxide, aluminum hydroxide, silica, glass, talc, mica, white carbon, magnesium oxide, and zinc oxide. The light spreading layer may have a thickness of about 5 μm to about 50 μm.

An optical display according to an embodiment may include the polarizing plate according to the above-described embodiments.

Figure 14:
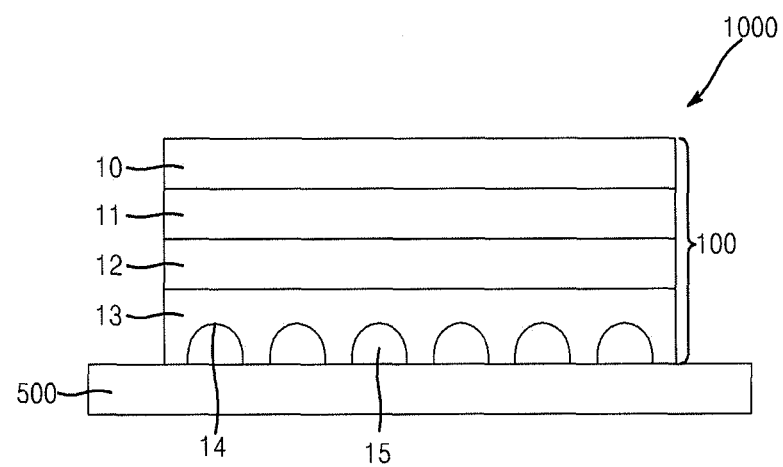
FIG. 14 illustrates a sectional view of an OLED display according to one embodiment.

FIG. 14 illustrates a sectional view of an OLED display according to one embodiment.

Referring to FIG. 14, an optical display 1000 may include an optical display panel 500, and a polarizing plate 100 on an, e.g., upper, surface of the panel 500. For example, the polarizing plate 100 may include a polarizer 10, a first retardation layer 11 on a lower side of the polarizer 10, a second retardation layer 12 on a lower side of the first retardation layer 11, and a pattern layer 13 on a lower side of the second retardation layer 12 (and including a plurality of engraved patterns 14 and a filling section 15). In an implementation, the optical display may include an organic light emitting diode (OLED) display. In an implementation, the polarizing plate may be attached to the display via adhesives.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

Figure 15:
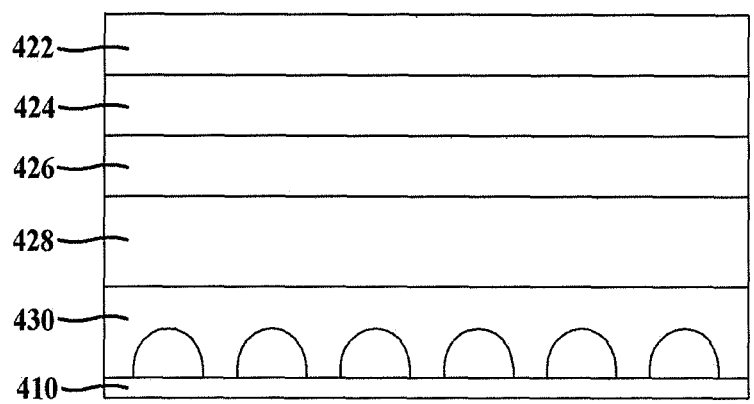
FIG. 15 illustrates a schematic sectional view of a testing device including a polarizing plate of Example 1.

FIG. 15 illustrates a schematic sectional view of a testing device including a polarizing plate of Example 1. Referring to FIG. 15, a polarizing plate including a protective film 422, a polarizer 424, a first retardation layer 426, a second retardation layer 428, and a pattern layer 430 was attached to a reflective plate 410 via an adhesive layer (not shown), followed by measurement of reflectivity and color shift.

(1) Preparation of First Retardation Layer 426

A first retardation layer 426 having a retardation of λ/2 was prepared through oblique stretching of a COP film (Zeonor, Zeon Co., Ltd., Japan) at an angle of 22.5° with respect to a perpendicular direction to an advancing direction of the film, that is, with respect to a width direction. Upon oblique stretching, one edge of the film was pulled in the width direction while the other edge of the film was pulled at an angle of 22.5° with respect to the width direction. In Example 1 to Example 8, the films were stretched at a temperature of 105° C. to 125° C. to 1.3 to 3 times an initial length thereof, and had Re and Rth as shown in Table 1. Then, the first retardation layer 426 was subjected to primer treatment by coating silicon particles on one side of the first retardation layer 426 to improve adhesion in a subsequent process. The first retardation layer 426 had a thickness of 45 nm.

(2) Preparation of Second Retardation Layer 428

A λ/4 retardation acrylic film (thickness: 45 to 55 μm, Okura Co., Ltd., Japan) having Re and Rth at a wavelength of 550 nm as shown in Table 1 was used as the second retardation layer 428.

(3) Preparation of Polarizer 424

The 22 μm thick polarizer 424 was prepared by dyeing a polyvinyl alcohol film (PS60, Kuraray Co., Ltd., Japan) with iodine at 27° C., followed by stretching the dyed PVA film at 57° C. to 6 times an initial length thereof in the advancing direction thereof.

(4) Preparation of Pattern Layer 430

The pattern layer 430 was formed by forming optical patterns on a resin layer formed of a UV curable transparent acrylic resin (RS1400, Aekyung Chemical, Co., Ltd. Korea) through engraving. The resin layer had an index of refraction of 1.52, and the pattern layer had a thickness of 50 μm. The engraved patterns included a plurality of lenticular concave lens patterns, which had a width of 10 μm, a height of 20 μm, and an aspect ratio of 2.0. A space in the concave lens was filled with air.

(5) Lamination

A water-based adhesive consisting of a PVA solution containing 99 wt % of water as a solvent was deposited onto both sides of the polarizer 424 to a thickness of 200 nm, followed by bonding the first retardation layer 426 and the protective film 422 thereto. As a protective film 422, a 60 μm thick low reflectance film (DSGO3SC-60, DNP Co., Ltd., Japan) was used. The low reflectance film included a TAC base and hollow silica particles coated onto the TAC base. The first retardation layer 426 was placed such that one surface of the first retardation layer 426 (subjected to primer treatment) faced the polarizer 424. The other surface of the first retardation layer 426 (not subjected to primer treatment) was subjected to corona treatment in order to improve adhesion thereof, and an epoxy adhesive was deposited to a thickness of 15 μm, thereby preparing a primary laminate film. The primary laminate film was bonded to the second retardation layer 428 by the epoxy adhesive deposited onto the primary laminate film through a roll-to-roll process.

Thereafter, adhesives were deposited onto the lower side of the second retardation layer 428, and the pattern layer 430 was bonded to the lower side of the second retardation layer 428 such that the plural lenticular concave lens patterns of the pattern layer 430 was exposed outside, thereby preparing a polarizing plate.

Example 2

A polarizing plate was prepared in the same manner as in Example 1 except that a pattern layer 430 was prepared by filling some of the spaces of the concave lenses with a transparent filling resin having a low index of refraction of 1.35 and filling the other spaces thereof with air.

Example 3

A polarizing plate was prepared in the same manner as in Example 2 except that a pattern layer 430 was prepared by filling some of the spaces of the concave lenses with a transparent filling resin having a low index of refraction of 1.35 and filling the other spaces thereof with air so as to form a plurality of layers therein.

Example 4

A polarizing plate was prepared in the same manner as in Example 1 except that a pattern layer 430 was prepared by completely filling the spaces of the concave lenses with a transparent filling resin having a low index of refraction of 1.35.

Example 5

A polarizing plate was prepared in the same manner as in Example 1 except that a pattern layer 430 was prepared by filling the spaces of the concave lenses with an adhesive having a low index of refraction of 1.44.

Example 6

A polarizing plate was prepared in the same manner as in Example 1 except that a pattern layer 430 was prepared by filling the spaces of the concave lenses with a UV curable transparent acrylic resin (SSC-3802, Index of refraction: 1.39, Shin-A T&C) containing a light spreading agent. The light spreading agent (SL-200, average particle size (D50): 2 µm, Cheil Industries Inc.) was present in an amount of 3 wt % in the acrylic resin.

Example 7

A polarizing plate was prepared in the same manner as in Example 6 except that the light spreading agent was present in an amount of 5 wt % in the acrylic resin.

Example 8

A polarizing plate was prepared in the same manner as in Example 1 except that, after a low reflectance film, a polarizer, a first retardation layer, a second retardation layer, and a pattern layer were sequentially stacked, a light spreading layer was formed on a lower surface of the pattern layer using a UV curable transparent acrylic resin (SSC-3802, Index of refraction: 1.39, Shin-A T&C) containing a light spreading agent. The light spreading agent (SL-200, average particle size (D50): 2 µm, Cheil Industries Inc.) was present in an amount of 3 wt % in the acrylic resin.

Comparative Example 1

A polarizing plate was prepared in the same manner as in Example 1 except that the polarizing plate did not include the first retardation layer 424.

Comparative Example 2

A polarizing plate was prepared in the same manner as in Example 1 except that the polarizing plate did not include the pattern layer 430.

Comparative Example 3

A polarizing plate was prepared in the same manner as in Example 4 except that the polarizing plate did not include the pattern layer 430.

TABLE 1

|  | First layer | | Second layer | | Bonding angle (°) | | Pattern layer |
|---|---|---|---|---|---|---|---|
|  | Re (nm) | Rth (nm) | Re (nm) | Rth (nm) | First layer | Second layer | |
| Example 1 | 260 | 218 | 130 | −100 | 22.5 | 90 | Included |
| Example 2 | 265 | 209 | 130 | −100 | 22.5 | 90 | Included |
| Example 3 | 270 | 212 | 130 | −100 | 22.5 | 90 | Included |
| Example 4 | 275 | 218 | 130 | −100 | 22.5 | 90 | Included |
| Example 5 | 280 | 226 | 130 | −100 | 22.5 | 90 | Included |
| Example 6 | 260 | 218 | 135 | −100 | 22.5 | 90 | Included |
| Example 7 | 260 | 218 | 140 | −113 | 22.5 | 90 | Included |
| Example 8 | 260 | 218 | 130 | −100 | 22.5 | 90 | Included |
| Comparative Example 1 | — | — | 130 | −100 | — | 90 | Included |
| Comparative Example 2 | 260 | 218 | 130 | −100 | 22.5 | 90 | Not included |
| Comparative Example 3 | 245 | 218 | 130 | −100 | 22.5 | 90 | Not included |

In Table 1, the first layer and the second layer refer to the first retardation layer and the second retardation layer, respectively, and the bonding angle refers to an angle with respect to the transmittance axis of the polarizer.

A black plate and a reflective plate were prepared using a mirror, and light emitted from a D65 standard light source was reflected by the black plate and the reflective plate to measure reflective brightness using an EZ Contrast (EDLIM Co., Ltd.).

The polarizing plate was attached to the reflective plate 410 via adhesives, and reflective brightness of the polarizing plate was measured. Here, with a polar angle fixed, reflective brightness values were measured while changing an incident azimuth angle of light from 0° to 360° by 1° each time, and were averaged.

Reflectance of the polarizing plate was calculated by the following equation.

Reflectance=[(Average reflective brightness of polarizing plate)−(Average reflective brightness of black plate)]/[(Average reflective brightness of reflective plate)−(Average reflective brightness of black plate)]×100

While changing the polar angle, reflectance according to various polar angles was obtained.

Color shift was calculated as a distance $[(a^{*2}+b^{*2})^{1/2},]$ from an original point $[(a^{*}, b^{*})=(0,0)]$ based on the CIELAB color coordinates obtained by converting the measured color codes of the polarizing plate.

TABLE 2

|  | Polar angle 10° | | Polar angle 45° | | Polar angle 60° | |
| --- | --- | --- | --- | --- | --- | --- |
|  | Reflectance (%) | Color shift | Reflectance (%) | Color shift | Reflectance (%) | Color shift |
| Example 1 | 1.7 | 3.0 | 4.5 | 9.0 | 9.3 | 11.4 |
| Example 2 | 1.8 | 2.89 | 4.4 | 8.9 | 9.2 | 11.2 |
| Example 3 | 1.8 | 2.7 | 4.4 | 8.88 | 9.0 | 11.5 |
| Example 4 | 1.8 | 2.9 | 4.3 | 9.1 | 9.1 | 11.8 |
| Example 5 | 2.0 | 3.6 | 5.0 | 9.4 | 9.7 | 12.1 |
| Example 6 | 1.7 | 2.9 | 4.3 | 8.8 | 9.0 | 11.1 |
| Example 7 | 1.7 | 2.8 | 4.1 | 8.8 | 8.9 | 11.0 |
| Example 8 | 1.7 | 3.2 | 4.6 | 8.8 | 9.5 | 10.9 |
| Comparative Example 1 | 2.0 | 5.6 | 4.7 | 18.5 | 10.3 | 16.1 |
| Comparative Example 2 | 1.8 | 8.48 | 5.34 | 11.11 | 11.88 | 14.64 |
| Comparative Example 3 | 1.95 | 5.62 | 6.47 | 15.59 | 14.16 | 20.93 |

As shown in Table 2, the polarizing plate according to Examples 1 to 8 exhibited low lateral reflectance and a lateral color shift of 12.5 or less, which approaches a substantially black color.

Conversely, the polarizing plate of Comparative Example 1, which did not include the first retardation layer, had low lateral reflectance and high lateral color shift. In addition, the polarizing plates of Comparative Examples 2 and 3, which did not include the pattern layer, also had low lateral reflectance and high lateral color shift.

By way of summation and review, with the development of larger OLED panels, lens-shaped sheets or films may be capable of reducing and/or preventing a WAD phenomenon (in which color shift to a blue color occurs due to white-out at a side surface upon self-luminescence). Such lens-shaped films may lack polarization at a certain angle on a side surface, thereby causing depolarization. As a result, a display may have reduced black visibility at a certain angle so that a black color may not be realized in some areas on a screen. A compensation film may employ a multilayer compensation film (instead of a single sheet of a reverse wavelength dispersion type compensation film) to help suppress depolarization through dispersion of depolarization.

A single sheet of a reverse wavelength dispersion compensation film may be used for anti-reflection of a reflective plate, and may be effective in products that do not suffer from the WAD phenomenon. Such a structure may be less effective in dispersion of a polarization direction for prevention of the WAD phenomenon. A particulate spreading technique may be used instead of the lens-shaped film to help remove back scattering in order to help reduce and/or prevent the WAD phenomenon. For example, a film may help prevent color change according to viewing angle of a liquid crystal display.

The embodiments may provide a polarizing plate for an OLED, which may help minimize lateral color shift, may help reduce the likelihood of and/or prevent undesirable white angular dependence (WAD), and may exhibit low lateral reflectivity and color shift.

The embodiments may provide a polarizing plate for OLEDs, which may help minimize lateral color shift and may help suppress WAD.

The embodiments may also provide a polarizing plate for OLEDs, which may exhibit less color change according to viewing angle.

The embodiments may also provide a polarizing plate for OLEDs, which may exhibit excellent light transmittance and excellent light diffusibility.

The embodiments may also provide a polarizing plate for OLEDs, which may have excellent reliability.

The embodiments may also provide a polarizing plate for OLEDs, which may have excellent processability and excellent economic feasibility.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A polarizing plate for an OLED, the polarizing plate comprising:
   a polarizer;
   a first retardation layer on a lower side of the polarizer;
   a second retardation layer on a lower side of the first retardation layer; and
   a pattern layer on a lower side of the second retardation layer, the pattern layer including a plurality of engraved patterns on a lower side thereof.

2. The polarizing plate as claimed in claim 1, wherein the pattern layer has an index of refraction of about 1.46 to about 1.80.

3. The polarizing plate as claimed in claim 1, wherein an aspect ratio (H/A) of a height (H) of each engraved pattern to a width (A) of each engraved pattern is about 1 to about 3.

4. The polarizing plate as claimed in claim 1, wherein:
   the engraved patterns are separated from each other, and
   a ratio (S/A) of a separation (S) between the engraved patterns to a width (A) of each of the engraved patterns is about 3.0 or less.

5. The polarizing plate as claimed in claim 1, wherein the pattern layer includes at least one of a (meth)acrylic resin, a polycarbonate resin, a polyester resin, a cycloolefin polymer resin, a cellulose resin, or a polyvinyl chloride resin.

6. The polarizing plate as claimed in claim 1, wherein each of the engraved patterns includes a filling section that is filled with a filler, the filler having a lower index of refraction than that of the pattern layer.

7. The polarizing plate as claimed in claim 6, wherein the filler includes air.

8. The polarizing plate as claimed in claim 6, wherein the filler includes a filling resin having an index of refraction of about 1.20 to about 1.45.

9. The polarizing plate as claimed in claim 6, wherein the filler includes:
a filling resin layer having an index of refraction of about 1.20 to about 1.45, and
an air layer stacked on the filling resin layer in a thickness direction of the filling section.

10. The polarizing plate as claimed in claim 6, wherein the filler includes:
a filling resin layer having an index of refraction from about 1.20 to about 1.45, and
an adhesive layer stacked on the filling resin layer in a thickness direction of the filling section.

11. The polarizing plate as claimed in claim 6, wherein the filler includes:
a filling resin having an index of refraction of about 1.20 to about 1.45, and
a light spreading agent.

12. The polarizing plate as claimed in claim 1, further comprising at least one of an adhesive layer, a first optical layer, a second optical layer, and a light spreading layer on a lower side of the pattern layer, wherein:
when the first optical layer is included, the first optical layer has a lower index of refraction than the pattern layer,
when the first optical layer and the second optical layer are included, the second optical layer has a lower index of refraction than the first optical layer.

13. The polarizing plate as claimed in claim 1, further comprising a base layer between the second retardation layer and the pattern layer.

14. The polarizing plate as claimed in claim 13, further comprising a light spreading layer between the base layer and the pattern layer.

15. The polarizing plate as claimed in claim 1, further comprising a protective layer on an upper side of the polarizer.

16. The polarizing plate as claimed in claim 8, wherein the filling resin includes at least one of a (meth)acrylic resin, a polycarbonate resin, a polyester resin, a cycloolefin polymer resin, a cellulose resin, or a polyvinyl chloride resin.

17. The polarizing plate as claimed in claim 12, wherein:
the polarizing plate includes the first optical layer, and
the first optical layer includes at least one of a (meth)acrylic resin, a polycarbonate resin, a polyester resin, a cycloolefin polymer resin, a cellulose resin, or a polyvinyl chloride resin.

18. The polarizing plate as claimed in claim 1, wherein:
the first retardation layer has an in-plane retardation (Re) at a wavelength of 550 nm of about 250 nm to about 300 nm, and
the second retardation layer has an in-plane retardation (Re) at a wavelength of 550 nm of about 110 nm to about 160 nm.

19. The polarizing plate as claimed in claim 1, wherein:
the first retardation layer has an out-of-plane retardation (Rth) at a wavelength of 550 nm of about 0 nm to about 300 nm, and
the second retardation layer has an out-of-plane retardation (Rth) at a wavelength of 550 nm of about −160 nm to about 0 nm.

20. The polarizing plate as claimed in claim 1, wherein:
the first retardation layer has a short wavelength dispersibility of about 1.00 to about 1.05 and a long wavelength dispersibility of about 0.95 to about 1.00, and
the second retardation layer has a short wavelength dispersibility of about 1.00 to about 1.20 and a long wavelength dispersibility of about 0.85 to about 1.00.

21. The polarizing plate as claimed in claim 1, wherein:
an angle defined between a slow axis of the first retardation layer and an absorption axis of the polarizer is about 63° to about 73° or about −73° to about −63°, and
an angle defined between a slow axis of the second retardation layer and the absorption axis of the polarizer is about −5° to about 5°.

22. An OLED display comprising the polarizing plate for an OLED as claimed in claim 1.

* * * * *